United States Patent
Tanaka et al.

(10) Patent No.: US 10,479,264 B2
(45) Date of Patent: Nov. 19, 2019

(54) OPTICAL UNIT

(71) Applicant: KOITO MANUFACTURING CO., LTD., Tokyo (JP)

(72) Inventors: Hidetada Tanaka, Shizuoka (JP); Kazutoshi Sakurai, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/028,673

(22) Filed: Jul. 6, 2018

(65) Prior Publication Data

US 2019/0009705 A1     Jan. 10, 2019

(30) Foreign Application Priority Data

Jul. 10, 2017   (JP) .................................. 2017-134838

(51) Int. Cl.
| | |
|---|---|
| *F21V 14/04* | (2006.01) |
| *B60Q 1/076* | (2006.01) |
| *F21S 41/148* | (2018.01) |
| *F21S 41/675* | (2018.01) |
| *F21S 41/19* | (2018.01) |
| *F21S 41/20* | (2018.01) |
| *F21S 41/255* | (2018.01) |
| *F21S 41/32* | (2018.01) |
| *F21S 41/33* | (2018.01) |
| *F21S 41/663* | (2018.01) |
| *F21W 102/14* | (2018.01) |

(52) U.S. Cl.
CPC ............ *B60Q 1/076* (2013.01); *F21S 41/148* (2018.01); *F21S 41/192* (2018.01); *F21S 41/255* (2018.01); *F21S 41/285* (2018.01); *F21S 41/321* (2018.01); *F21S 41/336* (2018.01); *F21S 41/663* (2018.01); *F21S 41/675* (2018.01); *F21W 2102/14* (2018.01)

(58) Field of Classification Search
CPC ................................ F21S 41/675; F21S 41/67
See application file for complete search history.

(56) References Cited

U.S. PATENT DOCUMENTS

| | | | | |
|---|---|---|---|---|
| 2014/0043805 | A1* | 2/2014 | Yamamura | F21S 10/026 362/231 |
| 2014/0177252 | A1* | 6/2014 | Lai | B60Q 1/085 362/514 |
| 2014/0313755 | A1* | 10/2014 | Tanaka | F21S 41/19 362/514 |
| 2016/0341388 | A1* | 11/2016 | Tanaka | F21S 41/336 |
| 2016/0341390 | A1* | 11/2016 | Yamamura | F21S 41/147 |
| 2017/0282786 | A1* | 10/2017 | Toda | F21S 41/00 |

FOREIGN PATENT DOCUMENTS

JP   2016-15332 A   1/2016

* cited by examiner

*Primary Examiner* — Andrew J Coughlin
(74) *Attorney, Agent, or Firm* — Sughrue Mion, PLLC

(57) ABSTRACT

When forming a first light distribution pattern, the controller is configured to control the magnitudes of the drive currents of first light emitting element and the second light emitting element. When forming a second light distribution pattern, the controller is configured to control so that the magnitude of the drive current of the second light emitting element is smaller than when forming the first light distribution pattern and/or so that a time period in which the drive current is to be supplied to the second light emitting element is shorter than when forming the first light distribution pattern.

7 Claims, 9 Drawing Sheets

OPTICAL UNIT

CROSS-REFERENCE TO RELATED APPLICATIONS

The present application claims the benefit of priority of Japanese Patent Application No. 2017-134838, filed on Jul. 10, 2017, the content of which is incorporated herein by reference.

TECHNICAL FIELD

The present disclosure relates to an optical unit, and particularly, to an optical unit that is to be used for a vehicle lamp.

BACKGROUND

In recent years, a vehicle lamp including a plurality of light emitting elements arranged in an array shape or in a matrix shape and configured to control turning-on and turning-off of each light emitting element and to thereby form a variety of light distribution patterns has been suggested (refer to Patent Document 1). The vehicle lamp is configured to change the light distribution patterns by increasing or decreasing current values of some light emitting elements and to thereby perform swivel control without using a mechanical means.

Patent Document 1: JP-A-2016-015332

In the vehicle lamp, an irradiation range of each light emitting element is constant, so that it is necessary to increase or decrease the current to be applied to each light emitting element so as to change the light distribution pattern. For this reason, the light distribution patterns that can be formed are limited.

SUMMARY

The present disclosure has been made in view of the above situations, and an object thereof is to provide a novel optical unit capable of forming light distribution patterns more suitable for situations.

In order to achieve the above object, an optical unit of an aspect of the present disclosure includes a light source including a plurality of light emitting elements, and a rotating reflector configured to rotate about an axis of rotation while reflecting light emitted from the light source. The rotating reflector has a reflective surface so as to form a light distribution pattern by scanning the light of the light source reflected while the rotating reflector is rotating, and the light source further includes a controller configured to control magnitudes of drive currents of a first light emitting element and a second light emitting element of the plurality of light emitting elements. (a) When forming a first light distribution pattern in which a first irradiation range to be irradiated by the light emitted from the first light emitting element and a second irradiation range to be irradiated by the light emitted from the second light emitting element overlap with each other, the controller controls the magnitudes of the drive currents of first light emitting element and the second light emitting element, (b) when forming a second light distribution pattern in which the first irradiation range and the second irradiation range overlap with each other and a maximum luminosity of the first irradiation range is higher than in the first light distribution pattern, the controller controls so that the magnitude of the drive current of the second light emitting element is smaller than when forming the first light distribution pattern and/or so that a time period in which the drive current is to be supplied to the second light emitting element is shorter than when forming the first light distribution pattern.

According to the above aspect, it is possible to form the plurality of light distribution patterns in which the maximum luminosity of the first irradiation range is different. Also, when forming the second light distribution pattern in which the maximum luminosity of the first irradiation range is higher than in the first light distribution pattern, the control is performed so that the magnitude of the drive current of the second light emitting element is smaller than when forming the first light distribution pattern and/or so that the time period in which the drive current is to be supplied to the second light emitting element is shorter than when forming the first light distribution pattern. Accordingly, it is possible to suppress a change in total sum of powers of at least the first light emitting element and the second light emitting element by comparing when forming the first light distribution pattern and when the second light distribution pattern.

When forming the second light distribution pattern, the controller may control so that the magnitude of the drive current of the first light emitting element is greater than when forming the first light distribution pattern. Thereby, it is possible to increase the maximum luminosity of the first irradiation range in the second light distribution pattern.

When forming the second light distribution pattern, the controller may control so that a time period in which the drive current is to be supplied to the first light emitting element is shorter than when forming the first light distribution pattern. Thereby, it is possible to suppress a change in power of the first light emitting element by comparing when forming the first light distribution pattern and when the second light distribution pattern.

The first light emitting element may be arranged so that a brightest region of the first light distribution pattern is to be included in the first irradiation range.

Another aspect of the present disclosure is also an optical unit. The optical unit includes a light source including a light emitting element, and a rotating reflector configured to rotate about an axis of rotation while reflecting light emitted from the light source. The rotating reflector has a reflective surface so as to form a light distribution pattern by scanning the light of the light source reflected while the rotating reflector is rotating, and the light source further includes a controller configured to control a magnitude of a drive current of the light emitting element. (a) When forming a first light distribution pattern including an irradiation range to be irradiated by the light emitted from the light emitting element, the controller controls the magnitude of the drive current of the light emitting element, and (b) when forming a second light distribution pattern in which a maximum luminosity of the irradiation range is higher than when forming the first light distribution pattern, the controller controls so that the magnitude of the drive current of the light emitting element is greater than when forming the first light distribution pattern and a time period in which the drive current is to be supplied to the light emitting element is shorter than when forming the first light distribution pattern.

According to the above aspect, it is possible to form a plurality of light distribution patterns in which the maximum luminosity of the irradiation range is different. Also, when forming the second light distribution pattern in which the maximum luminosity is higher than in the first light distribution pattern, the control is performed so that the time period in which the drive current is to be supplied to the light emitting element is shorter than when forming the first light distribution pattern. Accordingly, it is possible to suppress a change in power of the light emitting element by comparing when forming the first light distribution pattern and when the second light distribution pattern.

In the meantime, any combination of the above constitutional elements, and a method, an apparatus, a system and the like expressed by the present disclosure are also efficient as aspects of the present disclosure.

According to the present disclosure, it is possible to form the light distribution patterns more suitable for situations.

DESCRIPTION OF EMBODIMENTS

Figure 1:
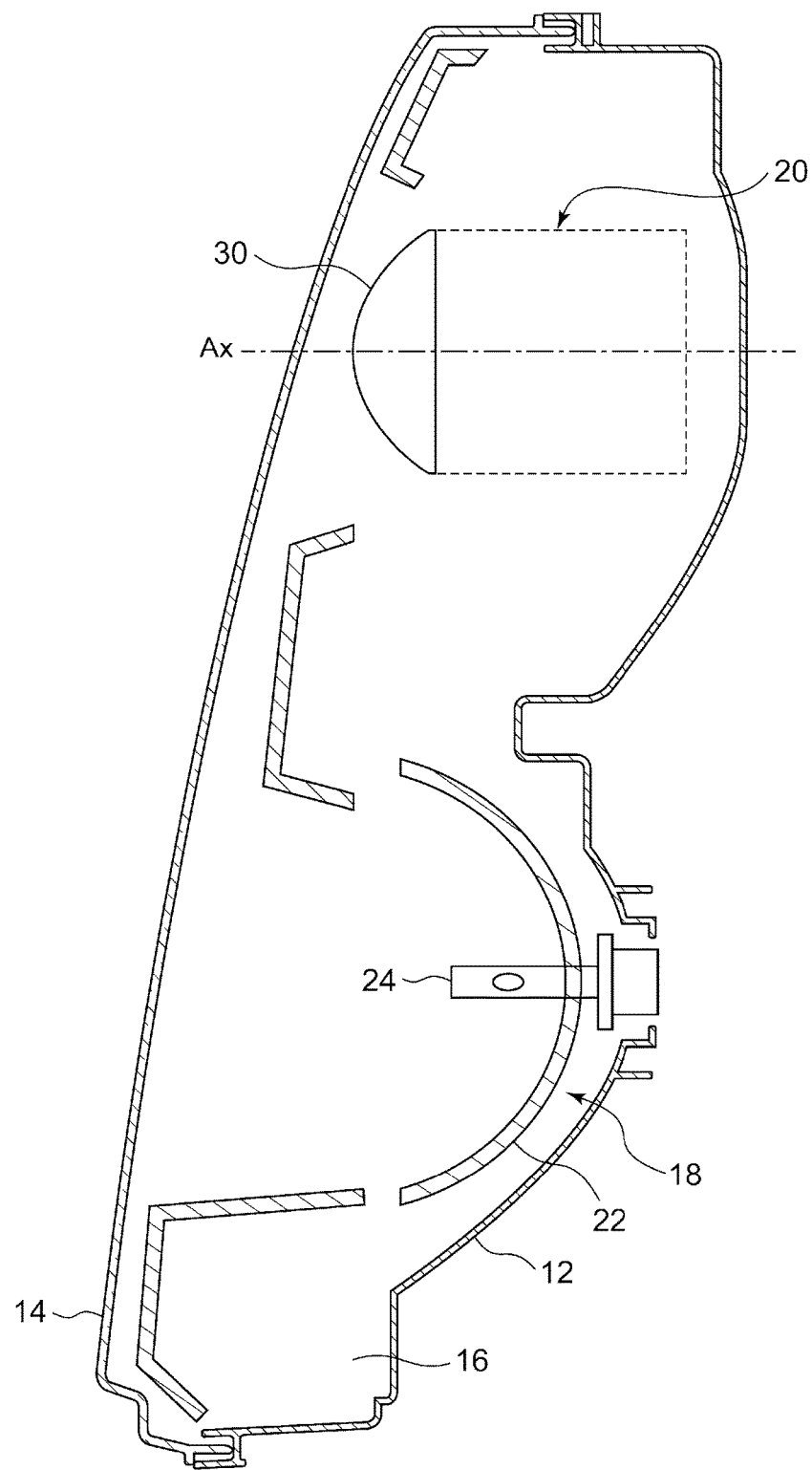
FIG. 1 is a horizontal sectional view of a vehicle headlight.

Hereinafter, embodiments of the present disclosure will be described with reference to the drawings. The same or equivalent structural elements, members and processing shown in each drawing are denoted with the same reference numerals, and overlapping descriptions thereof are appropriately omitted. Also, the embodiments are just exemplary, not to limit the invention, and all features and combinations thereof described in the embodiments are not necessarily essentials of the invention.

First Embodiment

An optical unit of the present disclosure can be applied to diverse vehicle lamps. First, an outline of a vehicle headlight to which an optical unit of a first embodiment can be mounted is described.

[Vehicle Headlight]

Figure 2:
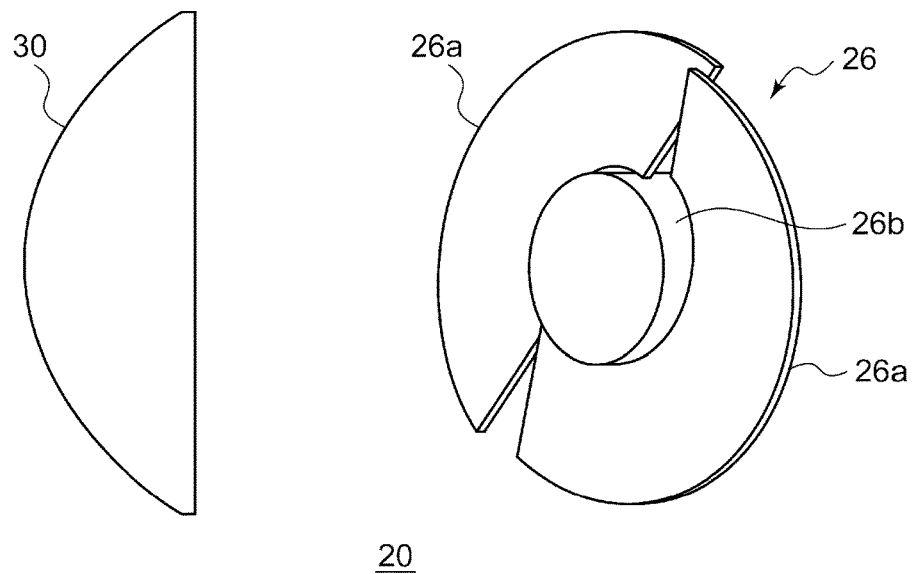
FIG. 2 is a pictorial top view depicting a configuration of an optical unit of an embodiment.
Figure 3:
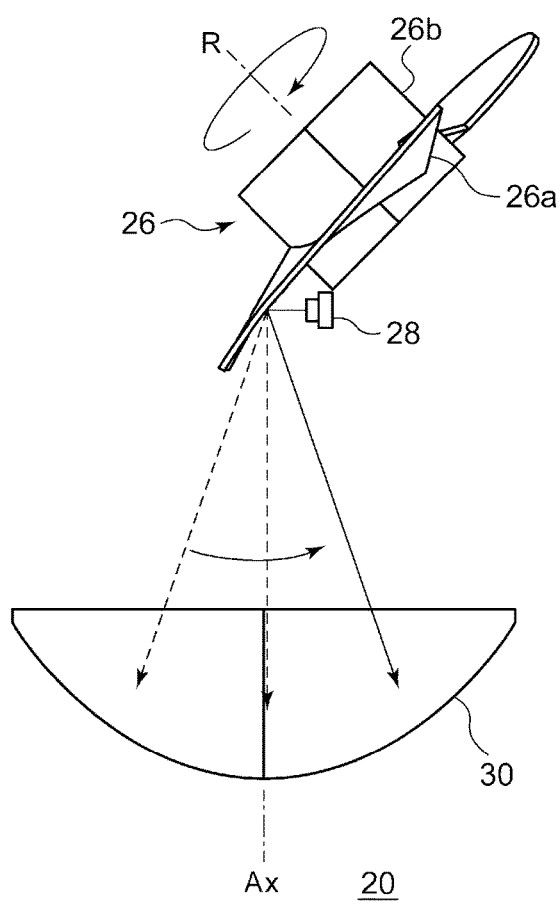
FIG. 3 is a side view of the optical unit of the embodiment.

FIG. 1 is a horizontal sectional view of a vehicle headlight. FIG. 2 is a pictorial top view depicting a configuration of an optical unit of a first embodiment. FIG. 3 is a side view of the optical unit of the first embodiment.

A vehicle headlight 10 shown in FIG. 1 is a right headlight that is to be mounted to a right side of a front end part of an automobile, and has the same structure as a headlight that is to be mounted to a left side, except that they are bilateral symmetrical to each other. For this reason, in the below, the right vehicle headlight 10 will be described in detail, and the description of the left vehicle headlight will be omitted As shown in FIG. 1, the vehicle headlight 10 has a lamp body 12 having a concave part that opens forward. A front opening of the lamp body 12 is covered by a transparent front cover 14, so that a lamp chamber 16 is formed. The lamp chamber 16 functions as a space in which two lamp units 18, 20 are accommodated with being arranged side by side in a vehicle width direction.

In the right vehicle headlight 10, the outer lamp unit 20, which is arranged at an upper side in FIG. 1, of the lamp units is a lamp unit having a lens, and is configured to irradiate a variable high beam. On the other hand, in the right vehicle headlight 10, the inner lamp unit 18, which is arranged at a lower side in FIG. 1, of the lamp units is configured to irradiate a low beam.

The lamp unit 18 for low beam includes a reflector 22, a light source bulb (candescent bulb) 24 supported to the reflector 22, and a shade (not shown). The reflector 22 is tiltably supported to the lamp body 12 by a well-known means (not shown), for example, a means of using an aiming screw and a nut.

The lamp unit 20 is an optical unit including a rotating reflector 26, an LED 28, and a convex lens 30 arranged in front of the rotating reflector 26 and serving as a projection lens. In the meantime, a semiconductor light emitting element such as an EL element and an LD element, instead of the LED 28, may also be used as the light source. In particular, for control of shielding a part of a light distribution pattern, a light source that can accurately perform turning-on and turning-off in a short time is preferably used. A shape of the convex lens 30 may be appropriately selected in correspondence to a required light distribution pattern and light distribution characteristics such as an illuminance distribution. For example, an aspherical lens or a free curved surface lens can also be used.

The rotating reflector 26 is configured to rotate in one direction about an axis of rotation R by a driving source (not shown) such as a motor. Also, the rotating reflector 26 has a reflective surface configured to reflect the light emitted from the LED 28 while the rotating reflector is rotating and to form a desired light distribution pattern.

The rotating reflector 26 has two blades 26a functioning as the reflective surface, having the same shape and provided at a periphery of a cylindrical rotation unit 26b. The axis of rotation R of the rotating reflector 26 is obliquely inclined relative to an optical axis Ax, and is provided in a plane including the optical axis Ax and the LED 28. In other words, the axis of rotation R is provided in substantially parallel with a scanning plane of the light (irradiation beam) of the LED 28 to be scanned in a right and left direction by rotation.

Thereby, the optical unit can be made thin. Here, the scanning plane can be understood as a fan-shaped plane that is formed by continuously connecting locus of the light of the LED 28, which is a scanning light. Also, in the lamp unit 20 of the first embodiment, the provided LED 28 is relatively small, and a position at which the LED 28 is arranged is between the rotating reflector 26 and the convex lens 30 and deviates from the optical axis Ax. For this reason, it is possible to shorten a depth direction (a front and rear direction of the vehicle) of the vehicle headlight 10, as compared to a configuration where the light source, the reflector and the lens are aligned in line on the optical axis, like a projector-type lamp unit of the related art.

Also, a shape of the blade 26a of the rotating reflector 26 is configured so that a secondary light source of the LED 28 resulting from the reflecting is to be formed in the vicinity of a focus of the convex lens 30. Also, the blade 26a has a twisted shape so that an angle between the optical axis Ax and the reflective surface changes in a circumferential direction about the axis of rotation R. Thereby, as shown in FIG. 3, it is possible to perform the scanning by using the light of the LED 28.

Figure 4:
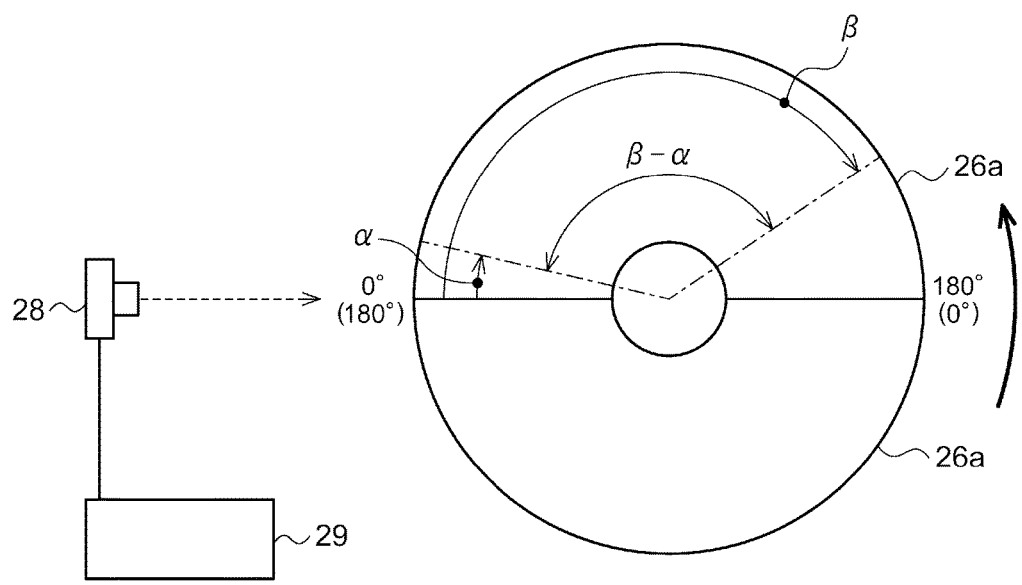
FIG. 4 is a pictorial view for illustrating rotation of a blade and turning-on and turning-off timings of an LED.

Subsequently, the turning-on and turning-off control of the LED 28 synchronized with the rotation of the rotating reflector 26 is described. FIG. 4 is a pictorial view for illustrating the rotation of the blade and turning-on and turning-off timings of the LED.

As shown in FIG. 4, the rotating reflector 26 has the two circular arc-shaped blades 26a of which shapes are the same, as seen from an axial direction. An angle of rotation of each blade 26a is an angle rotated from a position, at which the light of the LED 28 is to be irradiated to a boundary of the two blades 26a, when the position is defined as 0° (180°). For example, when the LED 28 is turned on all the time, each blade 26a functions as a reflecting mirror within a range of the angle of rotation from 00 to 180°, and a light source image of the LED 28 is scanned in front of the vehicle, so that a widest light distribution pattern can be formed.

Alternatively, the LED 28 may be configured to repeat the turning-on and turning-off at predetermined timings. For example, the LED 28 is turned on when the angle of rotation of the blade 26a becomes α[°], and the LED 28 is turned off when the angle of rotation becomes β[°]. Thereby, the blade 26a functions as a reflecting mirror within a range of the angle of rotation from α[°] to β[°].

In this way, the lamp unit 20 of the first embodiment can form a variety of light distribution patterns having different irradiation ranges by controlling the turning-on and turning-off timings of the LED 28, even though a plurality of light sources is not provided. In addition, the inventors found out that it is possible to form a variety of light distribution patterns in which not only the irradiation range but also the maximum luminosity is different by controlling a magnitude of current to be applied to the LED 28.

Figure 5A:
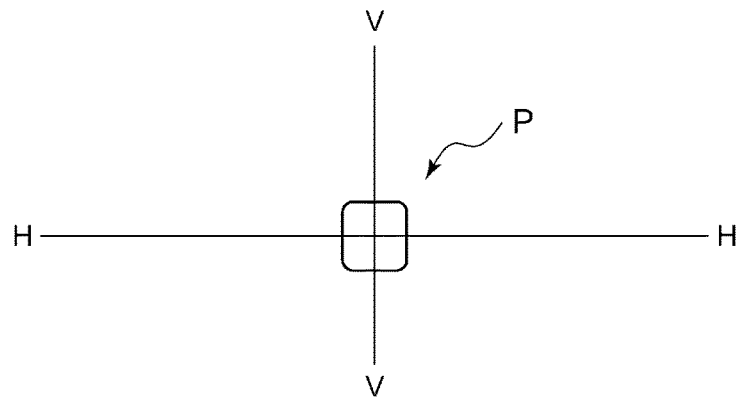
FIG. 5A depicts a pattern P formed by reflecting a light source image of a lighted LED with a stationary rotating reflector and projecting ahead the same.
Figure 5B:
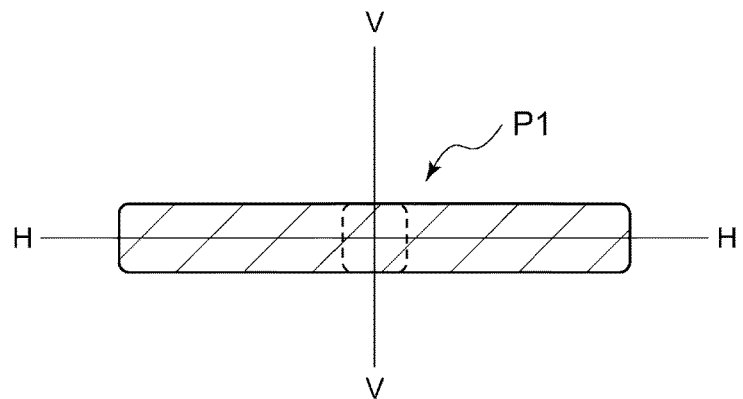
FIG. 5B depicts a first light distribution pattern P1 formed as a result of scanning of the pattern P shown in FIG. 5A.
Figure 5C:
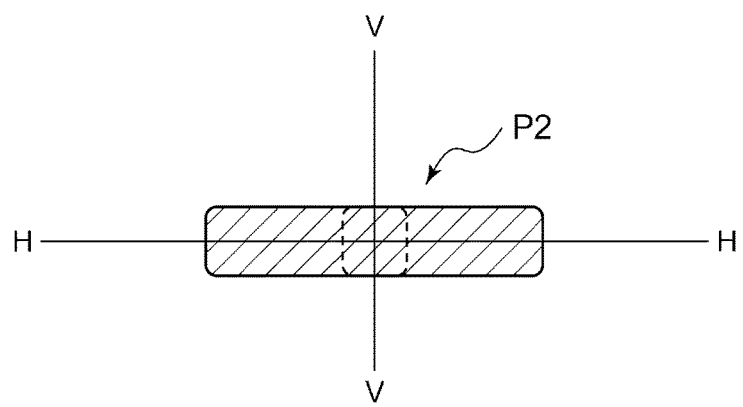
FIG. 5C depicts a second light distribution pattern P2 formed as a result of scanning of the pattern P shown in FIG. 5A.

FIG. 5A depicts a pattern P formed by reflecting a light source image of the lighted LED with the stationary rotating reflector 26 and projecting ahead the same, FIG. 5B depicts a first light distribution pattern P1 formed as a result of scanning of the pattern P shown in FIG. 5A, and FIG. 5C depicts a second light distribution pattern P2 formed as a result of scanning of the pattern P shown in FIG. 5A.

Figure 6A:
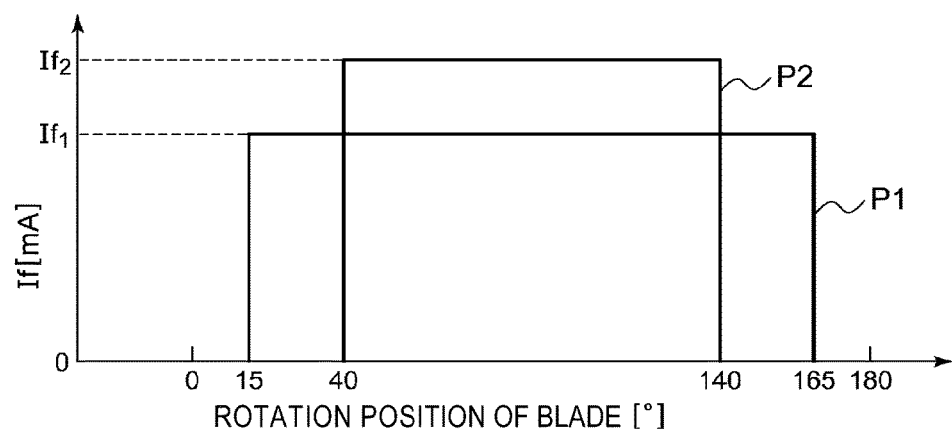
FIG. 6A depicts changes in forward current If of the LED when forming the first light distribution pattern and the second light distribution pattern.
Figure 6B:
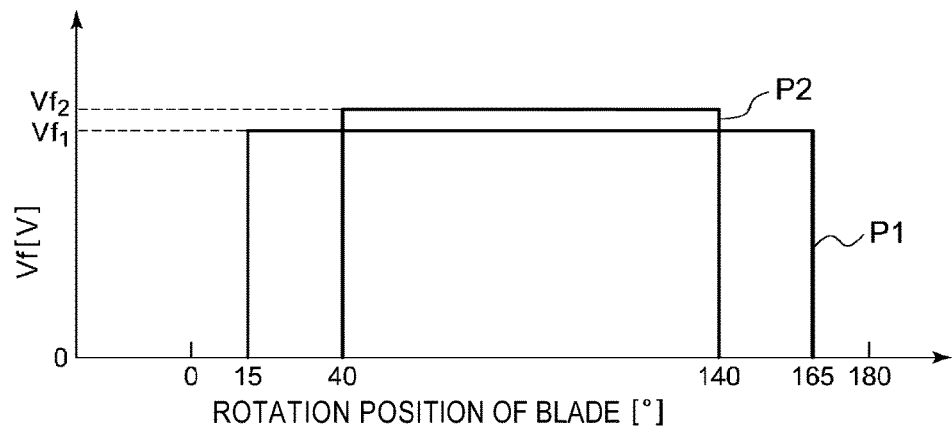
FIG. 6B depicts changes in forward voltage Vf of the LED when forming the first light distribution pattern and the second light distribution pattern.

FIG. 6A depicts changes in forward current If of the LED when forming the first light distribution pattern and the second light distribution pattern, and FIG. 6B depicts changes in forward voltage Vf of the LED when forming the first light distribution pattern and the second light distribution pattern.

As described above, the lamp unit 20 of the first embodiment includes the LED 28, and the rotating reflector 26 configured to rotate about the axis of rotation while reflecting the light emitted from the LED 28. The rotating reflector 26 has the reflective surface so as to form a light distribution pattern by scanning the light of the LED 28 reflected while the rotating reflector is rotating. The LED 28 has a controller 29 (refer to FIG. 4) configured to control a magnitude of a drive current of the LED.

When forming the first light distribution pattern P1 shown in FIG. 5B, the controller 29 applies a forward current $If_1$ to the LED 28 at timing at which the rotation position of the blade 26a is 15°, as shown in FIG. 6A. At this time, a forward voltage is $Vf_1$ (refer to FIG. 6B). Also, the controller 29 sets the forward current, which is being applied, to zero (0) at timing at which the rotation position of the blade 26a is 165°. In this way, when forming the first light distribution pattern P1 including an irradiation range, which is to be irradiated by the light emitted from the LED 28, the controller 29 controls the magnitude of the drive current of the LED 28.

Also, when forming the second light distribution pattern P2 in which a maximum luminosity of the irradiation range is higher than in the first light distribution pattern P1, the controller 29 applies a forward current $If_2$ ($If_2>If_1$) to the LED 28 at timing at which the rotation position of the blade 26a is 40°. At this time, the forward voltage is $Vf_2$ (refer to FIG. 6B). Also, the controller 29 sets the forward current, which is being applied, to zero (0) at timing at which the rotation position of the blade 26a is 140°. In this way, when forming the second light distribution pattern P2 in which the maximum luminosity of the irradiation range is higher than in the first light distribution pattern P1, the controller 29 controls so that the magnitude of the drive current of the LED 28 is greater than when forming the first light distribution pattern P1 and a time period in which the drive current is to be supplied to the LED 28 is shorter than when forming the first light distribution pattern P1.

Thereby, it is possible to form the plurality of light distribution patterns P1, P2 in which the maximum luminosity of the irradiation range is different. Also, when forming the second light distribution pattern P2 in which the maximum luminosity is higher than in the first light distribution pattern P1, the time period in which the drive current is supplied to the LED 28 is controlled to be shorter than when forming the first light distribution pattern P1. Accordingly, it is possible to suppress the change in power of the LED 28 by comparing when forming the first light distribution pattern P1 and when forming the second light distribution pattern P2.

Second Embodiment

Figure 7:
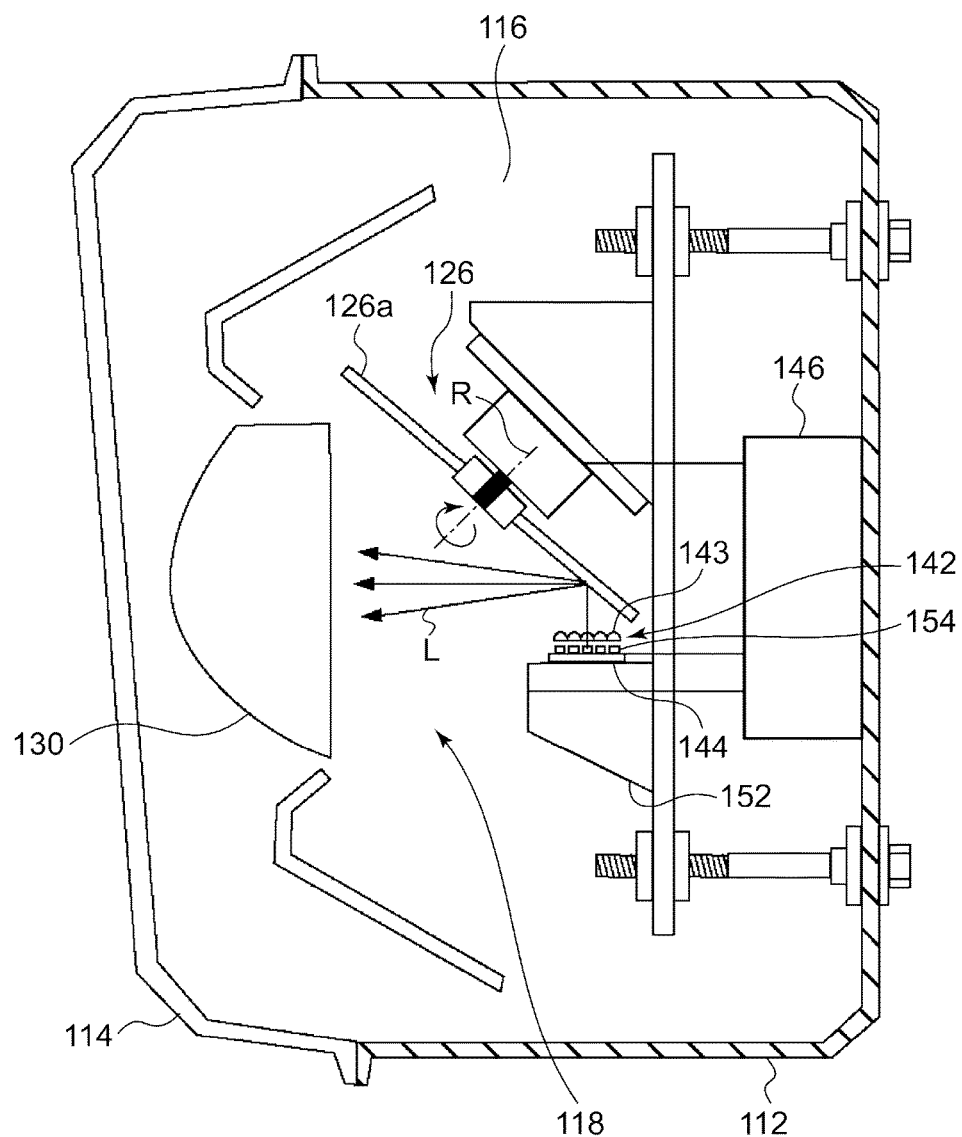
FIG. 7 is a horizontal sectional view of a vehicle headlight of a second embodiment.
Figure 8:
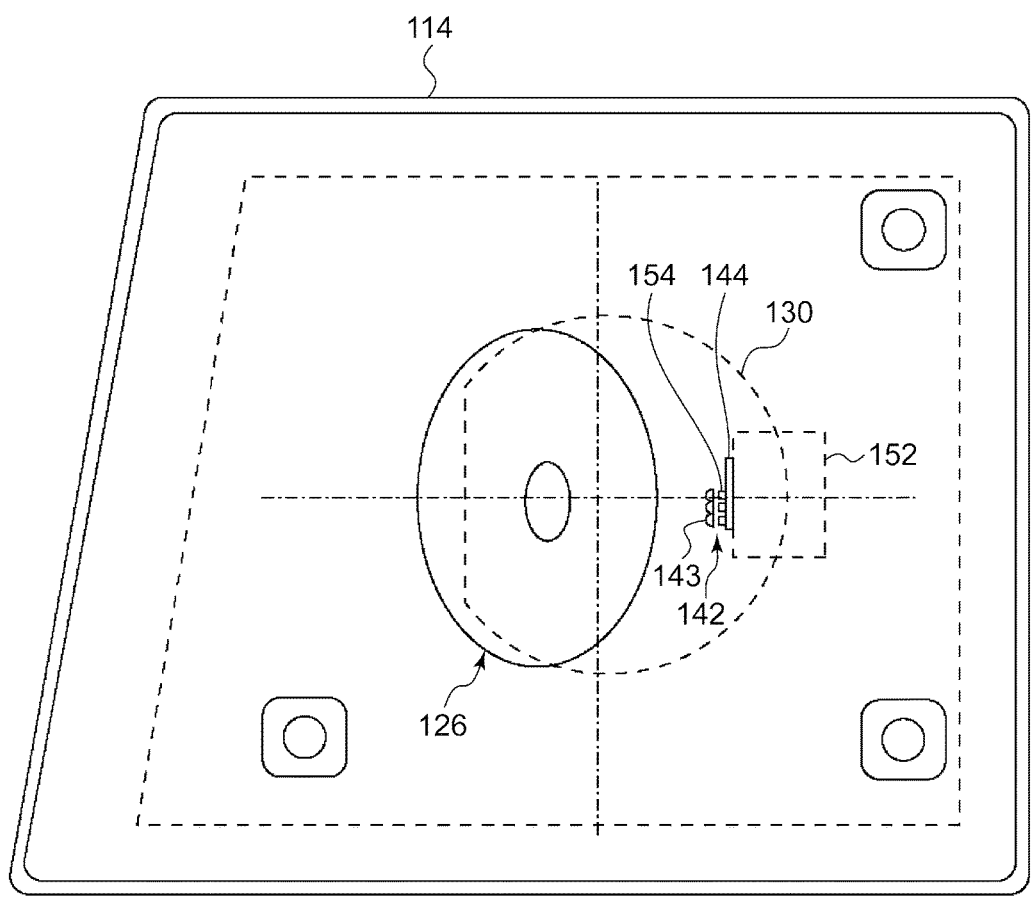
FIG. 8 is a front view of the vehicle headlight of the second embodiment.

FIG. 7 is a horizontal sectional view of a vehicle headlight of a second embodiment. FIG. 8 is a front view of the vehicle headlight of the second embodiment. Meanwhile, in FIG. 8, some components are omitted.

A vehicle headlight 100 of the second embodiment is a left headlight that is to be mounted at a left side of a front end part of an automobile, and has the same structure as a headlight that is to be mounted to a right side, except that they are bilateral symmetrical to each other. For this reason, in the below, the left vehicle headlight 100 will be described in detail, and the description of the right vehicle headlight will be omitted. Also, the descriptions of the configurations overlapping with the optical unit of the first embodiment will be appropriately omitted.

As shown in FIG. 7, the vehicle headlight 100 has a lamp body 112 having a concave part that opens forward. A front opening of the lamp body 112 is covered by a transparent front cover 114, so that a lamp chamber 116 is formed.

The lamp chamber 116 functions as a space in which one lamp unit 118 is accommodated. The optical unit 118 is a lamp unit configured to irradiate a variable high beam. The variable high beam is a beam that is controlled so as to change a shape of a light distribution pattern for high beam, and may generate a non-irradiation region (light shielding part) at a part of the light distribution pattern, for example.

The optical unit 118 of the second embodiment includes a light source 142 having a plurality of light emitting elements, condensing lenses 143 each of which serves as a primary optical system (optical member) configured to change a light path of a light L emitted from the light source 142 and to direct the light toward a blade 126a of a rotating reflector 126, the rotating reflector 126 configured to rotate about an axis of rotation R while reflecting the light L, a convex lens 130 serving as a projection lens configured to project the light L reflected on the rotating reflector 126 in a light irradiation direction (a leftward direction in FIG. 7) of the optical unit, a controller 146 configured to control drive currents of the plurality of light emitting elements of the light source 142, and a heat sink 152 having the light source 142 mounted thereto.

The rotating reflector 126 has a similar configuration to the rotating reflector 26, and is provided with the blade 126a serving as a reflective surface so as to form a predetermined light distribution pattern by scanning forward the light emitted while the rotating reflector is rotating. For each light source, an LED or a semiconductor light emitting element such as an EL element, an LD element and the like is used. A shape of the convex lens 130 may be appropriately selected in correspondence to a required light distribution pattern and light distribution characteristics such as an illuminance distribution. For example, an aspherical lens or a free curved surface lens can also be used.

Figure 9:
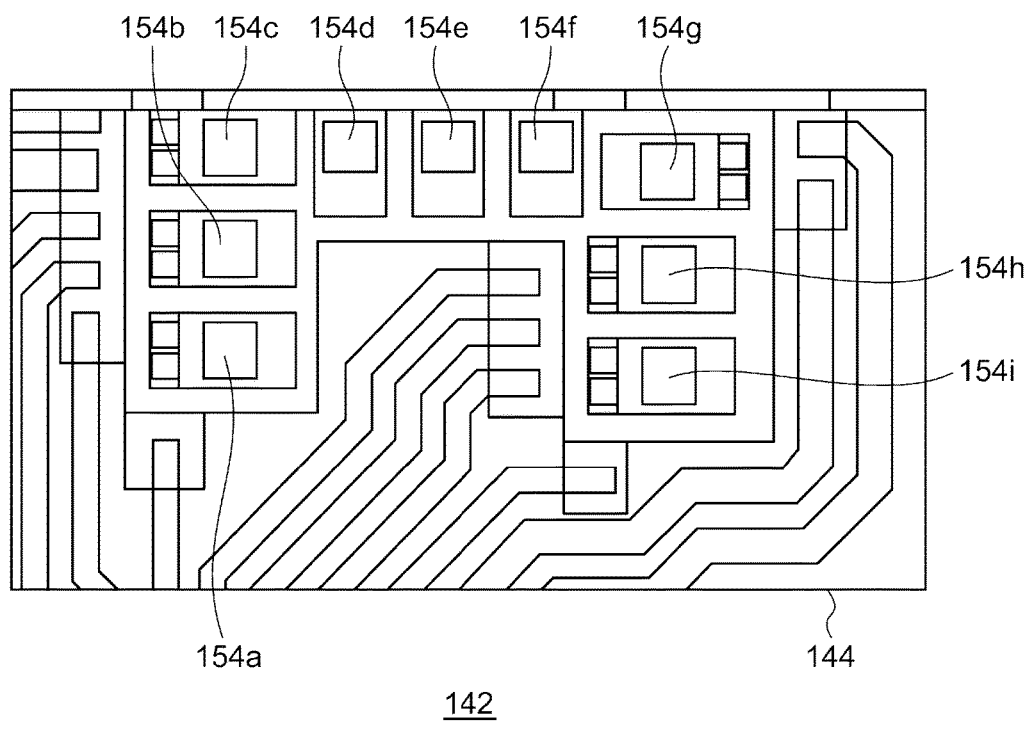
FIG. 9 is a top view of a light source of the second embodiment.

FIG. 9 is a top view of the light source 142 of the second embodiment.

are arranged in three stages on a circuit board 144, in which the five LEDs 154c to 154g are arranged on an upper stage, the two LEDs 154b, 154h are arranged on a middle stage and the two LEDs 154a, 154i are arranged on a lower stage. The two LEDs 154b, 154h on the middle stage are arranged adjacently below the LEDs 154c, 154g of both ends of the five LEDs 154c to 154h on the upper stage, and the two LEDs 154a, 154i on the lower stage are arranged adjacently below the two LEDs 154b, 154h on the middle stage. Each of the LEDs 154a to 154i is configured to be individually turned on and off.

As shown in FIGS. 7 and 8, the condensing lenses 143 configured by a plurality of inner lenses corresponding to respective light emission surfaces of the respective LEDs 154 of the light source 142 are arranged at the light emission surface-side. Thereby, the lights emitted from the LEDs 154 reach the reflective surface of the rotating reflector 126 with being little diverged.

Figure 11:
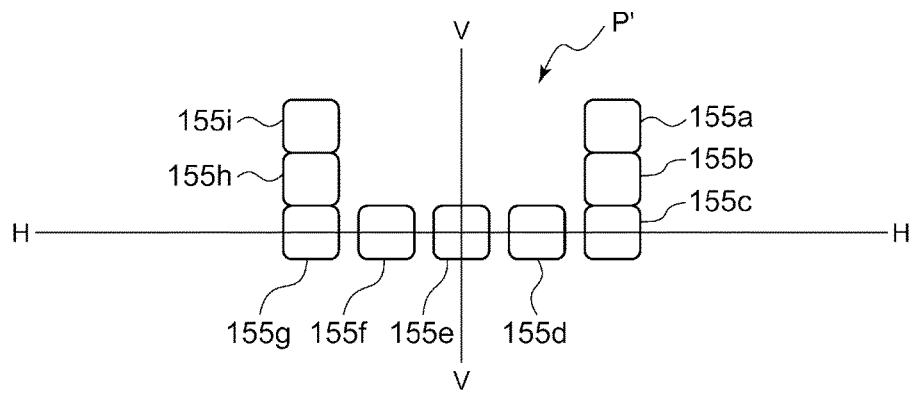
FIG. 11 depicts a pattern P' formed by reflecting a light source image with the stationary rotating reflector in a state where the light source is fully turned on, and projecting ahead the same.
Figure 12:
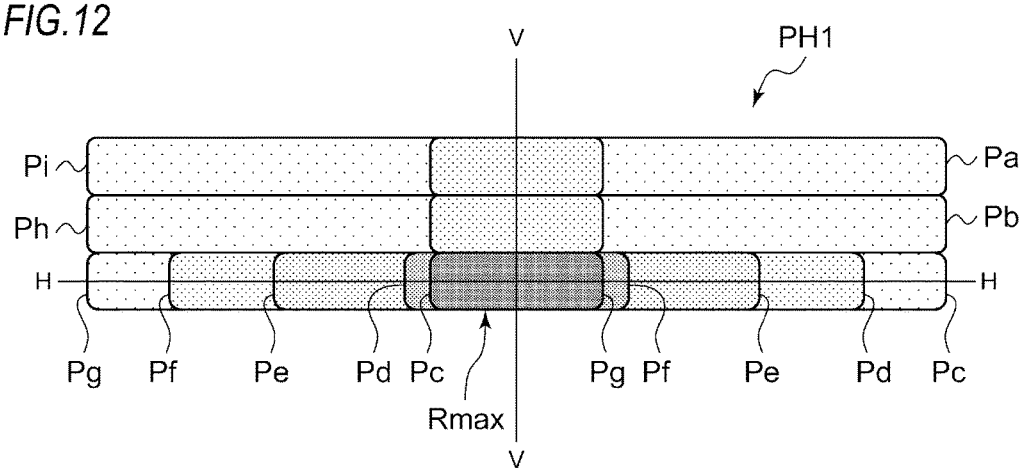
FIG. 12 is a pictorial view depicting a first light distribution pattern formed by the vehicle headlight including an optical unit of the second embodiment.
Figure 13:
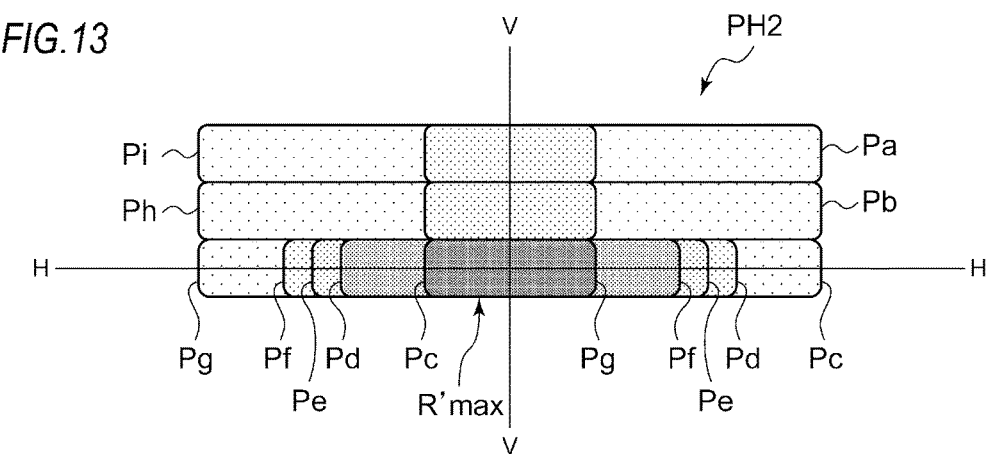
FIG. 13 is a pictorial view depicting a second light distribution pattern formed by the vehicle headlight including the optical unit of the second embodiment.

FIG. 11 depicts a pattern P' formed by reflecting the light source image with the stationary rotating reflector 126 in a state where the light source 142 is fully turned on, and projecting ahead the same. FIG. 12 is a pictorial view depicting a first light distribution pattern formed by the vehicle headlight 100 including the optical unit of the second embodiment. FIG. 13 is a pictorial view depicting a second light distribution pattern formed by the vehicle headlight 100 including the optical unit of the second embodiment. In the meantime, a light distribution pattern PH1 for normal high beam shown in FIG. 12 and a light distribution pattern PH2 for high-speed high beam shown in FIG. 13 are examples of a pattern generated as a result of scanning of the pattern P' shown in FIG. 11.

As shown in FIG. 11, a concave pattern P' is formed by light source images 155a to 155i corresponding to the respective light emission surfaces of the LEDs 154a to 154i.

Also, the light source images 155a to 155i of the LEDs 154a to 154i are respectively scanned, so that scan patterns Pa to Pi shown in FIG. 12 are formed. The respective scan patterns Pa to Pi are overlapped with each other, so that an integral light distribution pattern PH1 for normal high beam with no gap is formed.

Table 1 shows driving conditions of the respective LEDs when forming the light distribution pattern PH1 for normal high beam.

TABLE 1

| | | LED | | | | | | | | |
|---|---|---|---|---|---|---|---|---|---|---|
| | | 154g | 154f | 154e | 154d | 154c | 154h | 154b | 154i | 154a |
| Current If [mA] | | 1000 | 1000 | 1000 | 1000 | 1000 | 700 | 700 | 500 | 500 |
| Voltage Vf [V] | | 3.5 | 3.5 | 3.5 | 3.5 | 3.5 | 3.4 | 3.4 | 3.3 | 3.3 |
| Using range of blade | start angle α [°] | 10 | 10 | 15 | 30 | 10 | 10 | 10 | 10 | 10 |
| | end angle β [°] | 170 | 150 | 165 | 170 | 170 | 170 | 170 | 170 | 170 |
| Duty [%] | | 88.9 | 77.8 | 83.3 | 77.8 | 88.9 | 88.9 | 88.9 | 88.9 | 88.9 |
| Average power [W] | | 3.11 | 2.72 | 2.92 | 2.72 | 3.11 | 2.12 | 2.12 | 1.47 | 1.47 |
| Total power [W] | 21.7 | | | | | | | | | |

Figure 10:
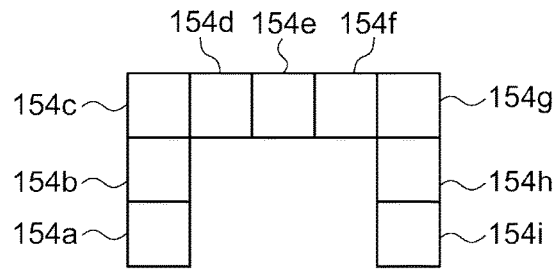
FIG. 10 a pictorial view depicting a positional relation of a plurality of LEDs mounted on the light source.

FIG. 10 a pictorial view depicting a positional relation of a plurality of LEDs mounted on the light source 142.

The light source 142 of the second embodiment has a plurality of LEDs 154 arranged in an array shape. Specifically, as shown in FIG. 9, the nine LEDs 154 (154a to 154i)

As shown in Table 1, the five LEDs 154c to 154g on the upper stage, which are configured to mainly irradiate a region including an H-H line, of the nine LEDs of the light source 142 are driven so that the forward current If becomes 1000 mA. Also, the two LEDs 154b, 154h on the middle stage are driven so that the forward current If becomes 700 mA. Also, the two LEDs 154a, 154i on the lower stage are driven so that the forward current If becomes 500 mA.

Thereby, a region, in which the scan patterns Pc to Pg are overlapped with each other, of the light distribution pattern PH1 for normal high beam becomes a maximum luminosity region Rmax.

In the meantime, an interval between the LED 154a and the LED 154i is set so that at least parts of the scan pattern Pa and the scan pattern Pi are overlapped with each other. Likewise, an interval between the LED 154b and the LED 154h is set so that at least parts of the scan pattern Pb and the scan pattern Ph are overlapped with each other. Also, the LEDs 154a to 154i are respectively arranged so that the respective scan patterns Pa to Pi are overlapped with the other adjacent scan patterns. Meanwhile, in FIGS. 12 and 13, the overlapping parts are not shown, except the overlapping parts of the scan patterns Pc to Pg.

Also, when forming the light distribution pattern PH1 for normal high beam, lighting ratios (Duty[%]) of the respective LEDs are defined so that the irradiation ranges by the adjacent scan patterns are overlapped with each other (refer to Table 1). Also, when driving the light source 142 with the conditions shown in Table 1, the total power of the entire light source is 21.7 W.

Table 2 shows driving conditions of the respective LEDs when forming a light distribution pattern PH2 for high-speed high beam for further improving far-field visibility during high-speed traveling.

In the meantime, when forming the light distribution pattern PH2 for high-speed high beam, the lighting ratios (Duty[%]) of the respective LEDs are defined so that the irradiation ranges by the adjacent scan patterns are overlapped with each other (refer to Table 2). The lighting ratio of each LED is set lower than when forming the light distribution pattern PH1 for normal high beam. In this way, when forming the light distribution pattern PH2 for high-speed high beam for improving far-field visibility, the drive currents of the LEDs 154c to 154g are increased so as to increase the maximum luminosity in the vicinity of H-V, the drive currents of the other LEDs are decreased, and the lighting ratios of the respective LEDs are reduced, so that the total power of the entire light source is little changed, as compared to the light distribution pattern PH1 for normal high beam. Specifically, when driving the light source 142 with the conditions shown in Table 2, the total power of the entire light source is 21.3 W.

As described above, the optical unit 118 that is used for the vehicle headlight 100 of the second embodiment includes the light source 142 having the plurality of LEDs 154 and the rotating reflector 126 configured to rotate about the axis of rotation while reflecting the light emitted from the light source 142. The rotating reflector 126 has the reflective surface so as to form the light distribution pattern by scanning the light of the light source reflected while the rotating reflector is rotating.

The light source 142 further includes a controller 146 configured to respectively control the magnitudes of the

TABLE 2

| | | LED | | | | | | | |
|---|---|---|---|---|---|---|---|---|---|
| | | 154g | 154f | 154e | 154d | 154c | 154h | 154b | 154i | 154a |
| Current If [mA] | | 1400 | 1400 | 1400 | 1400 | 1400 | 600 | 600 | 400 | 400 |
| Voltage Vf [V] | | 3.7 | 3.7 | 3.7 | 3.6 | 3.6 | 3.4 | 3.4 | 3.3 | 3.3 |
| Using range of blade | start angle α [°] | 50 | 50 | 30 | 10 | 10 | 50 | 10 | 50 | 10 |
| | end angle β [°] | 170 | 170 | 150 | 130 | 125 | 170 | 125 | 170 | 125 |
| Duty [%] | | 66.7 | 66.7 | 66.7 | 66.7 | 63.9 | 66.7 | 63.9 | 66.7 | 63.9 |
| Average power [W] | | 3.45 | 3.45 | 3.45 | 3.36 | 3.22 | 1.36 | 1.30 | 0.88 | 0.84 |
| Total Power [W] | | 21.3 | | | | | | | | |

As shown in Table 2, the five LEDs 154c to 154g on the upper stage, which are configured to mainly irradiate a region including an H-H line, of the nine LEDs of the light source 142 are driven so that the forward current If becomes 1400 mA. Also, the two LEDs 154b, 154h on the middle stage are driven so that the forward current If becomes 600 mA. Also, the two LEDs 154a, 154i on the lower stage are driven so that the forward current If becomes 400 mA.

Thereby, a region, in which the scan patterns Pc to Pg are overlapped with each other, of the light distribution pattern PH2 for high-speed high beam becomes a maximum luminosity region R'max. The LEDs 154c to 154g forming the scan patterns Pc to Pg are driven with the forward current If of 1400 mA, which is higher than the forward current Vf of 1000 mA when forming the light distribution pattern PH1 for normal high beam. For this reason, the maximum luminosity in the maximum luminosity region R'max of the light distribution pattern PH2 for high-speed high beam is higher than the maximum luminosity in the maximum luminosity region Rmax of the light distribution pattern PH1 for normal high beam.

drive currents of the plurality of LEDs 154. When forming the light distribution pattern PH1 for normal high beam in which the first irradiation range to be irradiated by the lights emitted from the LEDs 154c to 154g and the second irradiation range to be irradiated by the lights emitted from the LEDs 154a, 154b, 154h, 154i are overlapped with each other, for example, the controller 146 controls the magnitudes of the drive currents of the LEDs 154a to 154i.

Also, as shown in FIG. 13, the controller 146 controls the drive currents of the respective LEDs so as to form the light distribution pattern PH2 for high-speed high beam in which the first irradiation range to be irradiated by the lights emitted from the LEDs 154c to 154g and the second irradiation range to be irradiated by the lights emitted from the LEDs 154a, 154b, 154h, 154i are overlapped with each other, as shown in FIG. 13.

Specifically, when forming the light distribution pattern of the light distribution pattern PH2 for high-speed high beam in which the maximum luminosity of the first irradiation range is higher than in the light distribution pattern PH1 for normal high beam, the controller 146 controls so that the magnitudes of the drive currents of the LEDs 154a, 154b, 154h, 154i are smaller than when forming the light distribution pattern PH1 for high beam, and/or so that the time period in which the drive currents are to be supplied to the LEDs 154a, 154b, 154h, 154i is shorter than when forming the light distribution pattern PH1 for high beam.

Thereby, it is possible to form the plurality of light distribution patterns in which the maximum luminosity of the first irradiation range is different. Also, when forming the light distribution pattern PH2 for high-speed high beam in which the maximum luminosity of the first irradiation range is higher than in the light distribution pattern PH1 for high beam, the control is performed so that the magnitudes of the drive currents (If=400 mA, 600 mA) of the LEDs 154a, 154b, 154h, 154i are smaller than when forming the light distribution pattern PH1 for high beam (If=500 mA, 700 mA) and/or so that the time period (Duty=63.9 to 66.7%) in which the drive currents are to be supplied to the LEDs 154a, 154b, 154h, 154i is shorter than when forming the light distribution pattern PH1 for high beam (Duty=77.8 to 88.9%). Accordingly, it is possible to suppress the change in total sum of powers of the LEDs 154a to 154i by comparing when forming the light distribution pattern PH1 for high beam and when the light distribution pattern PH2 for high-speed high beam.

When forming the light distribution pattern PH2 for high-speed high beam, the controller 146 controls so that the magnitude of the drive current (If=1400 mA) of the LEDs 154c to 154g is greater than when forming the light distribution pattern PH1 for high beam (If=1000 mA). Thereby, it is possible to increase the maximum luminosity of the first irradiation range in the light distribution pattern PH2 for high-speed high beam.

When forming the light distribution pattern PH2 for high-speed high beam, the controller 146 controls so that the time period in which the drive currents are to be supplied to the LEDs 154c to 154g is shorter than when forming the light distribution pattern PH1 for high beam. Thereby, it is possible to suppress the change in powers of the LEDs 154c to 154g by comparing when forming the light distribution pattern PH1 for high beam and when the light distribution pattern PH2 for high-speed high beam.

The LEDs 154c to 154g are arranged so that the brightest maximum region of the light distribution pattern PH1 for high beam is to be included in the first irradiation range.

Although the present disclosure has been described with reference to the respective embodiments, the present disclosure is not limited to the embodiments and appropriate combinations or replacements of the configurations of the respective embodiments are also included in the present disclosure. Also, the combinations and processing sequences of the respective embodiments can be appropriately changed and modifications such as diverse design changes can be applied to the respective embodiments, based on knowledge of one skilled in the art. The embodiments to which the modifications are applied are also included within the range of the present disclosure.

The invention claimed is:

1. An optical unit comprising:
a light source including a plurality of light emitting elements, the plurality of light emitting elements including:
a first light emitting element; and
a second light emitting element; and
a rotating reflector configured to rotate about an axis of rotation while reflecting light emitted from the light source; and
a controller configured to control magnitudes of drive currents of the first and second light emitting elements and configured to control timing of the first and the second light emitting elements being turned on and turned off while the rotating reflector is rotating to generate a light distribution pattern including:
a first light distribution pattern including a first maximum luminosity and first drive current; and
a second light distribution pattern including a second maximum luminosity and a second drive current,
wherein in the first and second light distribution patterns, a first irradiation range to be irradiated by light emitted from the first light emitting element and a second irradiation range to be irradiated by light emitted from the second light emitting element overlap with each other,
when the second maximum luminosity is higher than in the first maximum luminosity, the controller is configured to control the second drive current is lower than the first drive current and/or configured to control the timing of the first and the second light emitting elements being turned on and turned off so that a second light distribution pattern range of the second light distribution pattern is smaller than a first light distribution pattern range of the first light distribution pattern.

2. The optical unit according to claim 1,
wherein when forming the second light distribution pattern, the controller is configured to control so that the magnitude of the drive current of the first light emitting element is greater than when forming the first light distribution pattern.

3. The optical unit according to claim 1,
wherein when forming the second light distribution pattern, the controller is configured to control so that a time period in which the drive current is to be supplied to the first light emitting element is shorter than when forming the first light distribution pattern.

4. The optical unit according to claim 1,
wherein the first light emitting element is arranged so that a brightest region of the first light distribution pattern is to be included in the first irradiation range.

5. The optical unit according to claim 1, wherein the controller is configured to control the timing of the first and second light emitting elements being turned on and turned off so that a time period in which the drive currents are to be supplied to the first and second light emitting elements in the second light distribution pattern is shorter than that for the first light distribution pattern.

6. An optical unit comprising:
a light source including a light emitting element;
a rotating reflector configured to rotate about an axis of rotation while reflecting light emitted from the light source; and
a controller configured to control a magnitude of a drive current of the light emitting element and configured to control a timing of the light emitting element being turned on and turned off while the rotating reflector is rotating to generate a light distribution pattern including:
a first light distribution pattern including a first irradiation range and a first maximum luminosity; and
a second light distribution pattern including a second irradiation range and a second maximum luminosity, wherein when the second maximum luminosity is higher than the first maximum luminosity, the controller is configured to control the timing of the light emitting element being turned on and turned off so that the first irradiation range is greater than the second irradiation range.

7. The optical unit according to claim 6, wherein the controller is configured to control the timing of the light emitting element being turned on and turned off so that a time period in which the drive current is to be supplied to the light emitting element for the second light distribution is shorter than when the drive current is to be supplied to the light emitting element for the first light distribution.

* * * * *